United States Patent
Sullivan et al.

(10) Patent No.: US 7,281,025 B2
(45) Date of Patent: Oct. 9, 2007

(54) TRIGGERED DDS PULSE GENERATOR ARCHITECTURE

(75) Inventors: Steven K. Sullivan, Beaverton, OR (US); Raymond L. Veith, Portland, OR (US); Iwao Akiyama, Shizuoka (JP); Yasumasa Fujisawa, Kamakura (JP); Yukio Aizawa, Tokyo (JP)

(73) Assignee: Tektronix, Inc., Beaverton, OR (US)

( * ) Notice: Subject to any disclaimer, the term of this patent is extended or adjusted under 35 U.S.C. 154(b) by 811 days.

(21) Appl. No.: 10/739,761

(22) Filed: Dec. 18, 2003

(65) Prior Publication Data

US 2005/0138094 A1 Jun. 23, 2005

(51) Int. Cl.
*G06F 1/02* (2006.01)

(52) U.S. Cl. ...................... 708/271; 708/272

(58) Field of Classification Search ................ 708/271, 708/272; 327/106
See application file for complete search history.

(56) References Cited

U.S. PATENT DOCUMENTS

| 5,598,440 A * | 1/1997 | Domagala ................... 375/329 |
| 7,084,676 B2 * | 8/2006 | Harron et al. ............... 327/105 |
| 7,124,153 B2 * | 10/2006 | Grushin ...................... 708/103 |

* cited by examiner

Primary Examiner—Chuong D Ngo
(74) Attorney, Agent, or Firm—William K. Bucher; Francis I. Gray

(57) ABSTRACT

A triggered DDS generator architecture accumulates a phase increment value in response to a DDS clock to generate phase accumulator values for addressing a waveform lookup table which contains a desired output signal. A time measurement circuit determines a time interval between the arrival of a trigger signal and a subsequent cycle of the DDS clock, which time interval is used to either adjust an initial phase accumulator value or delay the DDS clock so that a constant time is maintained between the arrival of the trigger signal and the desired output signal.

6 Claims, 4 Drawing Sheets

TIME LUT

| MEASURED TIME | INITIAL $\varphi$ |
|---|---|
| 0 SAMPLES | −PHASE |
| .1 | −PHASE−1 |
| .2 | −PHASE−2 |
| .3 | • |
| .4 | • |
| .5 | • |
| .6 | • |
| .7 | • |
| .8 | • |
| .9 | −PHASE−9 |

PHASE=MODULO

• SAMPLES − MEASURE TIME = 0.5
× SAMPLES − MEASURE TIME = 0

TRIGGERED OPERATION: MEASURE TIME = 0.5 SAMPLE

| STEP | PHASE ACCUMULATOR VALUE | LOOKUP TABLE |
|---|---|---|
| 0 | 0 | 0 |
| 1 | 0 | 0 |
| • | • | • |
| • | • | • |
| • | • | • |
| N | −5 | 0 |
| N+1 | 5 | 20 |
| N+2 | 15 | 60 |
| N+3 | 25 | 100 |
| • | 35 | 100 |
| • | 45 | 100 |
| • | 55 | 80 |
|   | 65 | 40 |
|   | 55 | 0 |
|   | • | • |
|   | • | • |
|   | • | • |

FIG.4A

MEASURE TIME = 0 SAMPLE

| 0 | 0 | 0 |
|---|---|---|
| 1 | 0 | 0 |
| • | • | • |
| • | • | • |
| • | • | • |
| N | 0 | 0 |
| N+1 | 10 | 40 |
| N+2 | 20 | 80 |
| • | 30 | 100 |
| • | 40 | 100 |
| • | 50 | 100 |
|   | 60 | 60 |
|   | • | • |
|   | • | • |
|   | • | • |

FIG.4B

TRIGGERED DDS PULSE GENERATOR ARCHITECTURE

BACKGROUND OF THE INVENTION

The present invention relates to pulse or function generation, and more particularly to a triggered direct digital synthesis (DDS) pulse generator architecture that produces a pulse or other waveform at a fixed time after receiving a trigger signal while maintaining an accurate and stable output frequency.

An advantage of using DDS is that the output frequency may be very accurate and stable. The output frequency is determined by a phase accumulator and a DDS clock. The timing error in the phase accumulator circuit is generally much less than the error in the DDS clock. The DDS clock is usually derived from a phase locked loop (PLL) which is referenced to a crystal controlled oscillator (VXCO). This allows the DDS clock to be relatively accurate and stable, allowing the frequency of the signal being generated to be accurate and stable.

Pulse generators have usually had a triggered mode of operation. In this mode an output pulse is generated after receiving a trigger signal at an input. One way to provide a triggered operation using DDS is to start the generation of the output pulse on the next DDS clock after receiving the trigger signal. This leads to a time uncertainty of up to one DDS clock period. For many applications this is unacceptable. Another way to provide triggered operation is for the DDS clock to stop after producing an output pulse and wait for the trigger signal. When the trigger signal arrives, the DDS clock is started and a new output pulse is produced. This type of clock is sometimes referred to as a gated clock. The primary disadvantage of this scheme is that it is difficult to phase lock an oscillator to a reference clock when the oscillator is starting and stopping. Also gated oscillators typically have some frequency variability as they start. To have both accurate operation and triggered operation a DDS generator may have two clocks. One is a phase locked oscillator that is accurate, but cannot be used in the triggered mode. The other clock is not very accurate, but may be stopped and started to allow the triggered mode. Such a DDS generator has a much reduced frequency accuracy specification when operated in the triggered mode.

What is desired is to generate an output pulse at a fixed time after receiving a trigger while maintaining an accurate and stable frequency.

BRIEF SUMMARY OF THE INVENTION

Accordingly the present invention provides a triggered DDS pulse generator architecture that accumulates a phase increment value in response to a DDS clock to generate phase accumulator values for addressing a waveform lookup table which contains a desired output signal. A time measurement circuit determines a time interval between the arrival of a trigger signal and a subsequent cycle of the DDS clock, which time interval is used to either adjust an initial phase accumulator value or delay the DDS clock so that a constant time is maintained between the arrival of the trigger signal and the desired output signal.

The objects, advantages and other novel features of the present invention are apparent from the following detailed description when read in conjunction with the appended claims and attached drawing figures.

BRIEF DESCRIPTION OF THE SEVERAL VIEWS OF THE DRAWING

FIGS. 4A, 4B and 4C illustrate the constant time between a trigger and a pulse output according to the present invention, with FIGS. 4A and 4B being table of values for different measured times and FIG. 4C being a graphic illustration of the resulting waveform.

DETAILED DESCRIPTION OF THE INVENTION

The present invention obtains triggered operation with a DDS clock oscillator that is continuously phase locked to a reference clock, such as a voltage crystal controlled oscillator (VXCO), a voltage controlled temperature compensated crystal oscillator (VCTCXO) or the like. When a trigger arrives, the time between the trigger signal and a subsequent DDS clock cycle is measured. The measured time is used to compute an initial phase accumulator value for a phase accumulator in a DDS circuit so that the time between the trigger signal and the start of an output pulse signal is constant. Because the DDS clock is not disturbed during triggered operation, the frequency accuracy of the output pulse signal is not degraded. After the time has been measured, digital computations and adjustment of the phase accumulator are sufficiently good so that no significant error is imparted to the output pulse signal. The only significant error comes from measuring the time between the trigger signal and the subsequent DDS clock cycle. This error shows up as jitter—variability between the arrival of the trigger signal and the generation of the output pulse signal. With care this error is made very small, giving the pulse generator both triggered operation and excellent frequency accuracy.

Figure 1:
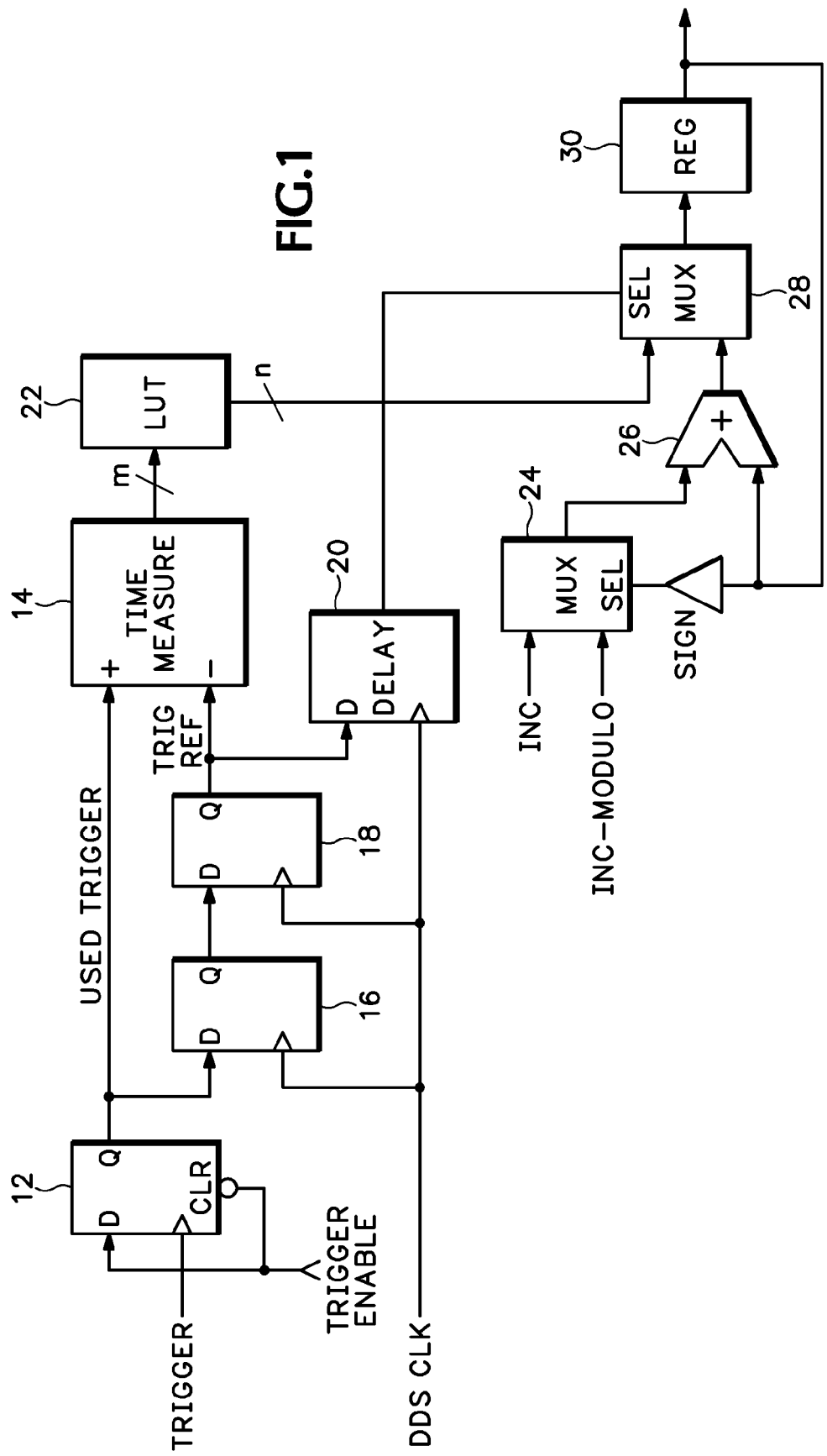
FIG. 1 is a block diagram view of a triggered DDS pulse generator architecture according to the present invention.

Referring now to FIG. 1 a trigger circuit and a portion of a DDS pulse generator are shown. A trigger signal is used to clock a trigger flip-flop 12 when enabled by a trigger enable signal. The output of the trigger flip-flop 12 is held at "0" until enabled and a trigger signal appears, at which point the output becomes "1". The output of the trigger flip-flop 12, or "used" trigger, is input to a time measurement circuit 14 as a start signal. The time measurement circuit 14 may be any type as is well known in the art. The used trigger also is input to a trigger synchronization circuit having a series of synchronization flip-flops 16, 18, such as two shown in this implementation. On the next DDS clock cycle after the trigger signal is received, the "1" from the output of the trigger flip-flop 12 is clocked into the first synchronization flip-flop 16 and then on a subsequent DDS clock cycle into the second synchronization flip-flop 18 to provide a trigger reference signal that is synchronized with the DDS clock. The trigger reference signal serves as a time measurement stop signal for the time measurement circuit 14. The trigger reference signal also is input to a delay circuit 20 that provides a one-cycle output after a fixed number of clock cycles to compensate for processing time through the time measurement circuit 14 and a time conversion lookup table (LUT) 22. The time conversion lookup table 22 converts an m-bit time measurement value from the time measurement circuit 14 to an initial phase accumulator value.

One example of the DDS pulse generator, as described in the co-pending U.S. patent application Ser. No. [DF7645], uses a negative phase accumulator value as the initial phase accumulator value, and counts up until a positive value occurs at the output. As shown a phase multiplexer 24 has as inputs a phase increment value and a phase increment value minus a modulo or period value. The output of the phase multiplexer 24 is input to an accumulator 26, the output of which is input to an initiation multiplexer 28. The output of the initiation multiplexer 28 is stored in a phase accumulation register 30, the output of which is converted by subsequent stages into an address for a waveform lookup table (not shown here). The output of the phase accumulation register 30 also is fed back to the accumulator 26, and the sign bit is used to select the data output by the phase multiplexer 24—the increment value while the sign is negative and the increment minus the modulo value (effectively subtracting the modulo value) when the sign goes positive. The other input to the initiation multiplexer 28 is an n-bit initial phase accumulator value from the time conversion lookup table 22. The output from the initiation multiplexer 28 is determined by the delayed one-cycle trigger reference from the delay circuit 20.

In operation the trigger flip-flop 12 is set when the input trigger signal goes high and the flip-flop is enabled. The trigger flip-flop 12 is only enabled when the trigger circuit is ready to accept another trigger. The synchronization flip-flops 16, 18 synchronize the user trigger to the DDS clock. Since the first flip-flop 16 occasionally becomes metastable, the second flip-flop 18 assures a good trigger reference for the timing measurement circuit 14. More than two synchronization flip-flops may be used if the DDS clock rate is very high and one clock period does not provide enough time for stabilization. The timing measurement circuit 14 measures the time between the used trigger and the trigger reference to produce the m-bit digital time value which is input to the time conversion lookup table 22. The lookup table 22 is pre-loaded with values that convert measured m-bit digital times to n-bit initial phase accumulator values. The output pulse from the delay circuit 20 switches the initiation multiplexer 28 in the phase accumulation portion of the DDS circuit for one DDS clock period, loading the phase accumulator with the initial phase accumulator value. The output from the phase accumulator register 30 normally varies between −PHASE (or −modulo) and −1. The values in the time conversion lookup table 22 are more negative than −PHASE, causing the first phase accumulator value after a trigger to be negative by an amount necessary to make the trigger-to-start-of-output be a constant time. This is shown in FIGS. 2-4.

Figure 2:
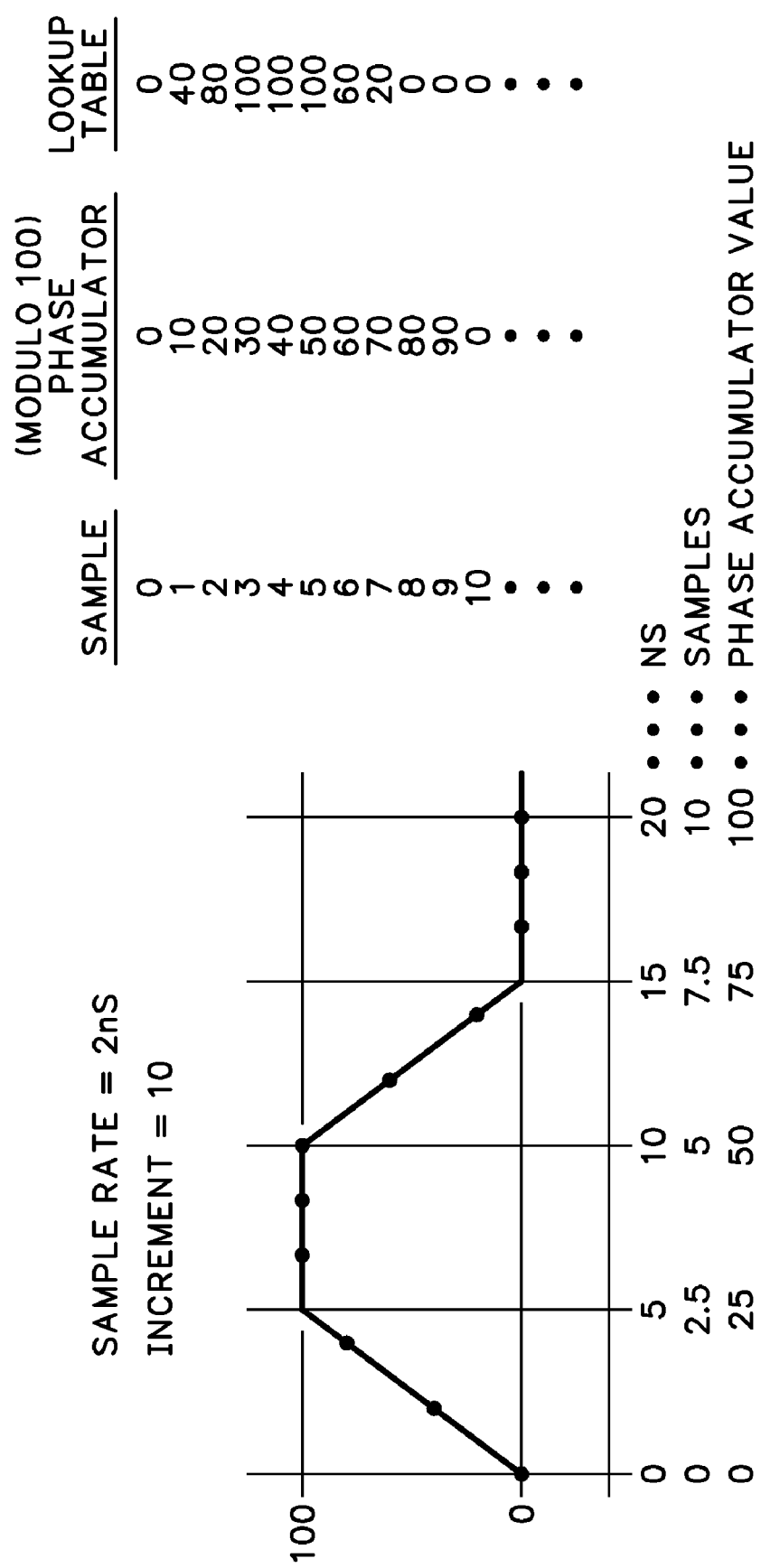
FIG. 2 is a graphic view and accompanying table for generating a pulse signal according to the present invention.
Figure 3:
FIG. 3 is a table view of a lookup table for a time measurement conversion according to the present invention.
Figure 4C:
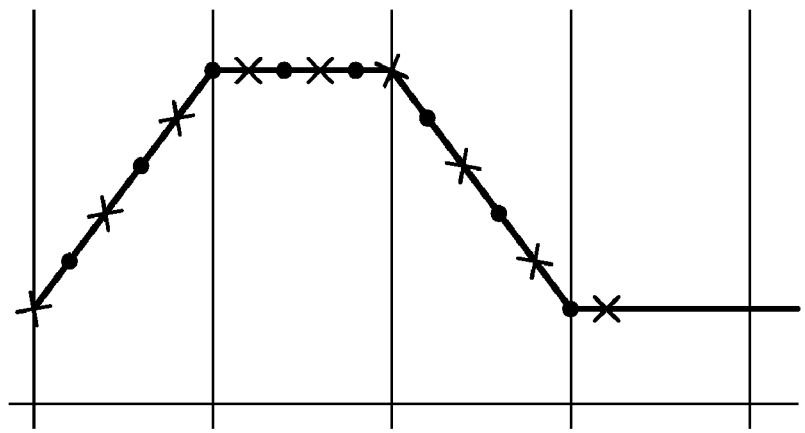

FIG. 2 shows a normal output of an untriggered DDS pulse generator where the phase increment is 10 and the sample rate is 2 ns. The negative values from the phase accumulation register 30 are subsequently converted to positive values, as disclosed in the above-mentioned co-pending application. The desired pulse waveform has a 5 ns rise time, a 5 ns peak value, a 5 ns fall time and then is at a low level. The corresponding phase accumulator values and resulting waveform lookup table values are shown in the accompanying table. FIG. 3 shows a table for the conversion of time values in tenths of a DDS clock cycle to an initial phase accumulation value, with an accompanying timeline showing that the initial phase accumulation value is at some point more negative than −PHASE by an amount "x" which is a function of the measured time. FIGS. 4A and 4B show the same table as FIG. 2 but with respective measured times of 0.5 sample and 0 sample respectively where the trigger occurs at sample N. FIG. 4C shows that the respective pulse signals from 4A and 4B result in the same delay after the trigger, i.e., the sample points define the same waveform although from different entries in the waveform lookup table.

Although the above describes a pulse generator and the generation of output pulses, the triggered operation described works for other types of DDS signal generators when generating any type of triggered output. Also rather than using the measured time to adjust the phase accumulator value while leaving the DDS clock unchanged, the measured time may be used to delay the DDS clock so that there is a constant time between the arrival of the trigger signal and the delayed DDS clock. Such a circuit may take a number of forms. In one form the time measurement produces a digital value that is then used to insert or remove delay from the DDS clock path by adding or removing delay elements or by adjusting delay elements. In another form an early version of the DDS clock is a two-phase or three-phase clock. When the trigger signal arrives, the magnitude of each phase is acquired—effectively measuring the time between the trigger signal and the DDS clock. The phase magnitudes are then used to produce the DDS clock with an adjusted phase so that the time between the arrival of the trigger signal and the adjusted DDS clock is constant.

In triggered mode when the signal generator has finished making a pulse or burst or sweep, it stops generating a signal and starts waiting for a trigger signal. The DDS circuits are placed into an idle mode. An example of the idle mode is when the phase accumulator is forced to zero where zero specifies the first point in the waveform in the lookup table. When a trigger signal arrives, the time between the used trigger signal and the reference trigger synchronized with the DDS clock is measured. After the measurement is completed, an initial phase accumulator value is found in a lookup table. This value is the amount needed to adjust the waveform so that it is delayed by an amount of time necessary to make the time between the trigger signal arrival and the start of the waveform a constant. This initial value is placed into the phase accumulator and normal operation of the signal generator proceeds.

The concept of using multiple DDS circuits in parallel to achieve a higher data rate complicates triggered operation. The time measurement circuit measured the trigger time relative to the DDS clock, producing a value that ranges between zero and the phase increment. With a single DDS circuit this value is always less than one phase increment since only one data word is generated each DDS clock cycle. However with n DDS circuits operating in parallel, the adjustment to the phase comparator value may be almost as large as n data values. It is important not to skip the first n points of the waveform. The initial points are always generated when the phase accumulator correction is done with subtraction, causing the phase accumulator values to go outside the normal range, and having an address mapping circuit that maps these values into the first point in the waveform lookup table. When the phase accumulator starts incrementing in the normal way, the phase accumulator values reenter the normal range of values and the waveform starts being produced from the very first point.

Thus the present invention provides a triggered DDS pulse generator architecture by measuring a time interval between the arrival of a trigger signal and an internal clock, and using the measured time interval to either adjust the phase accumulator value or to delay the DDS clock so that the time interval between the arrival of the trigger signal and the output pulse remains constant.

What is claimed is:

1. A triggered Direct Digital Synthesis (DDS) generator architecture of the type having means for accumulating a phase increment in response to a DDS clock to produce phase accumulator values that are used to address a waveform lookup table to provide a desired output signal further comprising:

means for measuring a time interval between the arrival of a trigger signal and a subsequent cycle of the DDS clock; and means in response to the time interval for maintaining a constant time between the arrival of the trigger signal and the desired output signal.

2. The triggered DDS generator architecture as recited in claim 1 wherein the maintaining means comprises means for selecting an initial phase accumulator value that maintains the constant time.

3. The triggered DDS generator architecture as recited in claim 2 wherein the measuring means comprises:

means for deriving a reference trigger and a used trigger from the trigger signal;

means for measuring the time interval between the reference and used triggers; and means for converting the time interval into the initial phase accumulator value.

4. The triggered DDS generator architecture as recited in claim 3 wherein the selecting means comprises:

a multiplexer coupled between an accumulator and an accumulation register in the accumulating means, the multiplexer having as inputs the initial phase accumulator value and an output from the accumulator; and a delay device clocked by the DDS clock having as input the reference trigger, the output of the delay device being a select signal for the multiplexer to select the initial phase accumulator value for input to the accumulation register a fixed interval after the reference trigger occurs.

5. The triggered DDS generator architecture as recited in claim 3 wherein the deriving means comprises:

an input trigger flip-flop having a trigger enable signal as an input and having the trigger signal as a clock input to produce the used trigger upon occurrence of the trigger signal after the trigger enable signal; and a series of reference flip-flops having the use trigger as an input and having the DDS clock as a clock input to produce the reference trigger upon the subsequent DDS clock cycle after the used trigger occurs.

6. The triggered DDS generator architecture as recited in claim 3 wherein the converting means comprises a lookup table that is addressed by the time interval to produce the initial accumulator value.

* * * * *